United States Patent
Ogawa et al.

(10) Patent No.: US 7,397,951 B2
(45) Date of Patent: Jul. 8, 2008

(54) IMAGE PROCESSING DEVICE AND IMAGE PROCESSING METHOD

(75) Inventors: Makoto Ogawa, Tokyo (JP); Kiyoto Ito, Chiba (JP); Tadashi Shibata, Tokyo (JP)

(73) Assignee: Rohm Co., Ltd., Kyoto (JP)

( * ) Notice: Subject to any disclaimer, the term of this patent is extended or adjusted under 35 U.S.C. 154(b) by 734 days.

(21) Appl. No.: 10/772,349

(22) Filed: Feb. 6, 2004

(65) Prior Publication Data

US 2004/0172436 A1 Sep. 2, 2004

(30) Foreign Application Priority Data

Feb. 7, 2003 (JP) .............................. 2003-031569

(51) Int. Cl.
*G06K 9/66* (2006.01)
(52) U.S. Cl. ..................................... 382/194
(58) Field of Classification Search ................ 382/195, 382/233, 236, 239, 275, 298; 358/1.1; 708/402; 711/200
See application file for complete search history.

(56) References Cited

U.S. PATENT DOCUMENTS

| | | | | |
|---|---|---|---|---|
| 4,947,446 A | * | 8/1990 | Jutand et al. ................. | 382/279 |
| 5,029,226 A | * | 7/1991 | Klein et al. .................. | 382/275 |
| 5,140,532 A | * | 8/1992 | Beckwith et al. ............. | 358/1.1 |
| 5,168,375 A | * | 12/1992 | Reisch et al. ................ | 382/250 |
| 5,305,398 A | * | 4/1994 | Klein et al. .................. | 382/298 |
| 5,321,522 A | * | 6/1994 | Eschbach ..................... | 382/239 |
| 5,495,538 A | * | 2/1996 | Fan ............................. | 382/233 |
| 5,673,214 A | * | 9/1997 | Kim et al. .................... | 708/402 |
| 5,748,792 A | * | 5/1998 | Wober ......................... | 382/250 |
| 5,903,672 A | * | 5/1999 | Yu .............................. | 382/236 |
| 6,052,488 A | * | 4/2000 | Takahashi et al. ........... | 382/239 |
| 6,311,258 B1 | * | 10/2001 | Gibson et al. ............... | 711/200 |
| 2005/0276505 A1 | * | 12/2005 | Raveendran ................. | 382/268 |

OTHER PUBLICATIONS

2003 IEEE International Solid-State Circuits Conference, vol. Forty-Six, ISSN 0193-6530 "Digest of Technical Papers", Paper 26.7.

* cited by examiner

*Primary Examiner*—Tsung-Yin Tsai
(74) *Attorney, Agent, or Firm*—Kenyon & Kenyon LLP

(57) ABSTRACT

SRAMs A, B, C, and D having pixel data of each small block of each large block, for example a small block $A_{ij}$ for the SRAM A, to simultaneously read out a plurality of pixel data in the small block by specifying an address assigned to each small block, and a matrix of coefficient in which a matrix of plural coefficients are arranged are provided. Also provided are a coefficient matrix controller 12 and an adding section 13 to multiply the plural coefficients respectively by pixel data corresponding to each thereof and obtain a sum of the multiplied results. Each pixel data of each small block forming one large block, the pixel data being read out from the SRAMs A, B, C, and D, are multiplied by the coefficient matrix rearranged into a predetermined order.

6 Claims, 9 Drawing Sheets

FIG. 8
(a) 3x3 Mean Filter
Division by 9
(b) 5x5 Mean Filter
Division by 25
(c) Vertical Egde Enhancement
Division by 10
Offset 128
(d) Gaussian Filter (σ = 1.4)
Division by 71
Original (128x128 pixel)

IMAGE PROCESSING DEVICE AND IMAGE PROCESSING METHOD

CROSS-REFERENCE TO RELATED APPLICATIONS

This application is based upon and claims the benefit of priority from the prior Japanese Patent Application No. 2003-031569, filed on Feb. 7, 2003, the entire contents of which are incorporated herein by reference.

BACKGROUND OF THE INVENTION

1. Field of the Invention

This invention relates to an image processing device and an image processing method to convert or detect images by performing a predetermined processing of a two-dimensional image.

2. Description of the Related Art

Conventionally, in order to convert or detect images by processing a two-dimensional image, processing is performed for each pixel one by one, in which data of plural pixels surrounding a certain pixel are processed.

Specifically, as shown in FIG. 9, for each of a matrix of pixels 101 which are large in number and compose a two-dimensional image, coefficients $A_0$ to $A_8$ are respectively corresponded to and multiplied by data $X_0$ to $X_8$, the pixel 101 and the eight neighboring pixels 102, surrounding the pixel 101 in a kernel block, and a sum of multiplied values, $A_0X_0 + A_1X_1 + \ldots + A_8X_8$, is obtained as a processing data of the pixel 101. By shifting the kernel to each pixel, the series of the above operations are performed for each of all necessary pixels.

However, the above-described image processing method, in which computational processing is performed for each of all necessary pixels, results in extremely large volume of computations and extremely high computational burden and power consumption. More specifically, in each time the calculation processing is performed, a necessary pixel data has to be transferred from a storage to a processor, and all data on the plural neighboring pixels in the kernel have to be downloaded. In addition, when the kernel scans throughout the two-dimensional image, the same pixel is repeatedly accessed, which is a serious problem.

SUMMARY OF THE INVENTION

In order to solve the above-described problems, the present invention is achieved, aiming at providing an image processing device and an image processing method to allow image processing without loss using relatively simple combination of equipment, in an extremely short time, and with low power consumption.

The image processing device according to the present invention performs image processing, in which a two-dimensional image is composed of a group of pixel data which are a matrix of plural pixel data, and includes a plurality of storages and a calculator. The storage is structured in such a manner that the group of pixel data are divided into small blocks formed of the plural pixel data described above, and the plural small blocks further form a large block, in each of which each small block is defined and arranged by certain rules, each of such small blocks located according to the rules stores the pixel data independently, and by specifying an address assigned to each of such small blocks, the plural pixel data within the small block can be simultaneously read out. The calculator multiplies the pixel data, which is included in each of the small blocks composing the one large block and read out from the plural storages, by the coefficient matrix which is rearranged into a predetermined order.

The image processing method according to the present invention is a method to perform image processing in which a two-dimensional image is formed of a group of pixel data which are a matrix of plural pixel data. In the method, the group of pixel data are divided into small blocks formed of the plural pixel data described above, and the plural small blocks further form a large block, in each of which each small block is defined and arranged by rules, each of such small block located according to the rules stores the pixel data independently in each storage, and by specifying an address assigned to each of such small blocks, the plural pixel data within the small block can be simultaneously read out from the storage. Here, the pixel data, which are included in each of the small blocks composing the one large block and read out from the plural storages, are multiplied by the coefficient matrix rearranged into a predetermined order, and summed up.

BRIEF DESCRIPTION OF THE DRAWINGS

FIG. 8 is a schematic view showing a structure of the kernel in detail; and

DETAILED DESCRIPTION OF THE PREFERRED EMBODIMENTS

The preferred embodiments of the present invention will now be described with reference to the drawings.

Figure 1:
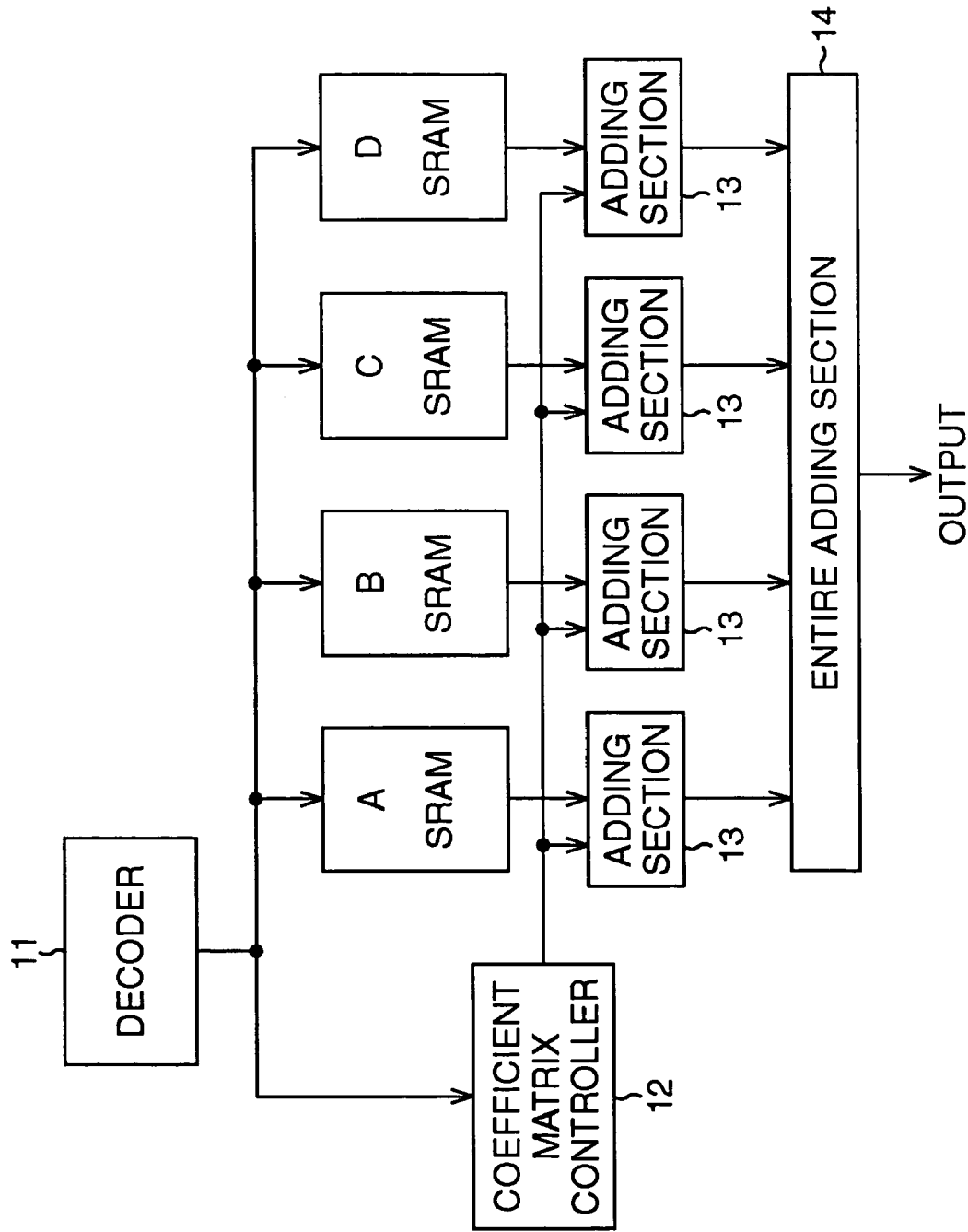
FIG. 1 is a block diagram showing a schematic configuration of an image processing device according to a present embodiment.

FIG. 1 is a block diagram showing a schematic configuration of an image processing device according to a preferred embodiment of the present invention. This image processing device includes: a plurality of cells, four individual memory cells in the case herein, which are SRAMs A, B, C, and D; a decoder 11 to allow these memory cells to access pixel data; a coefficient matrix controller 12 to provide computational processing of the pixel data read out from the memory cell; an adding section 13 provided in the neighborhood of each memory cell to add up computed results of each pixel (the coefficient matrix controller 12 and the adding section 13 form a calculator); and an entire adding section 14 to further add up the results obtained by each of adding section 13.

Figure 2:
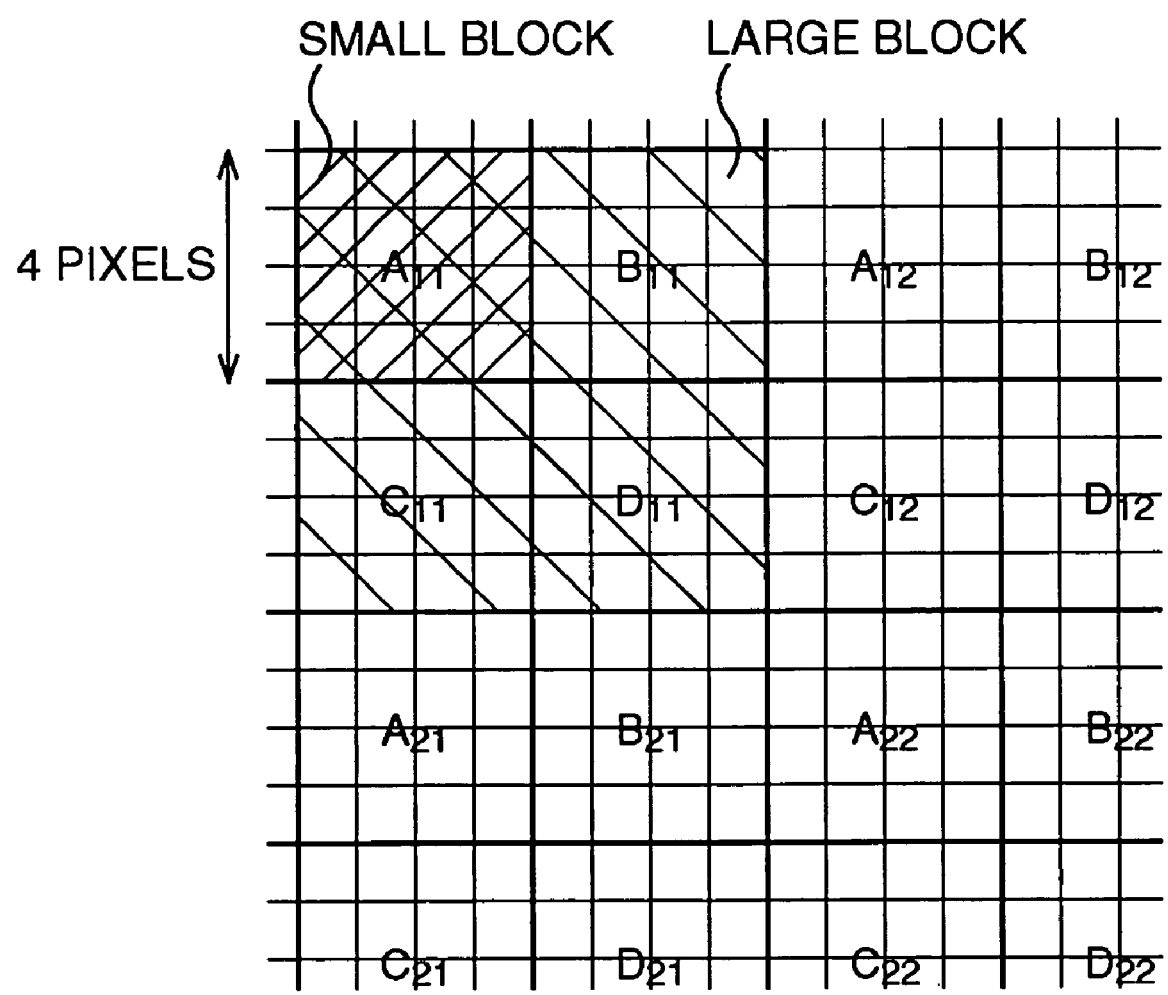
FIG. 2 is a schematic view showing a group of pixel data of the image processing device according to the present embodiment.

As shown in FIG. 2, in the image processing device, a two-dimensional image is composed of a group of pixel data which are a matrix of plural pixel data, and these pixel data are divided as follows. First, the group of pixel data are divided into small blocks composed of plural pixel data, an example of which is that each small block is composed of 4.times.4 pixels. Next, a plurality of small blocks, 2.times.2 blocks for example, form a large block. Here, in each large block, each of small blocks is defined and arranged by certain rules. For example, each of four small blocks forming each large block are defined according to its location, and specified as $A_{ij}$, $B_{ij}$, $C_{ij}$, and $D_{ij}$ (I, j=1, 2, 3 . . . ). Here, the number of the memory cells should be the same as, or more than, the number of the small blocks forming each large block.

Figure 3:
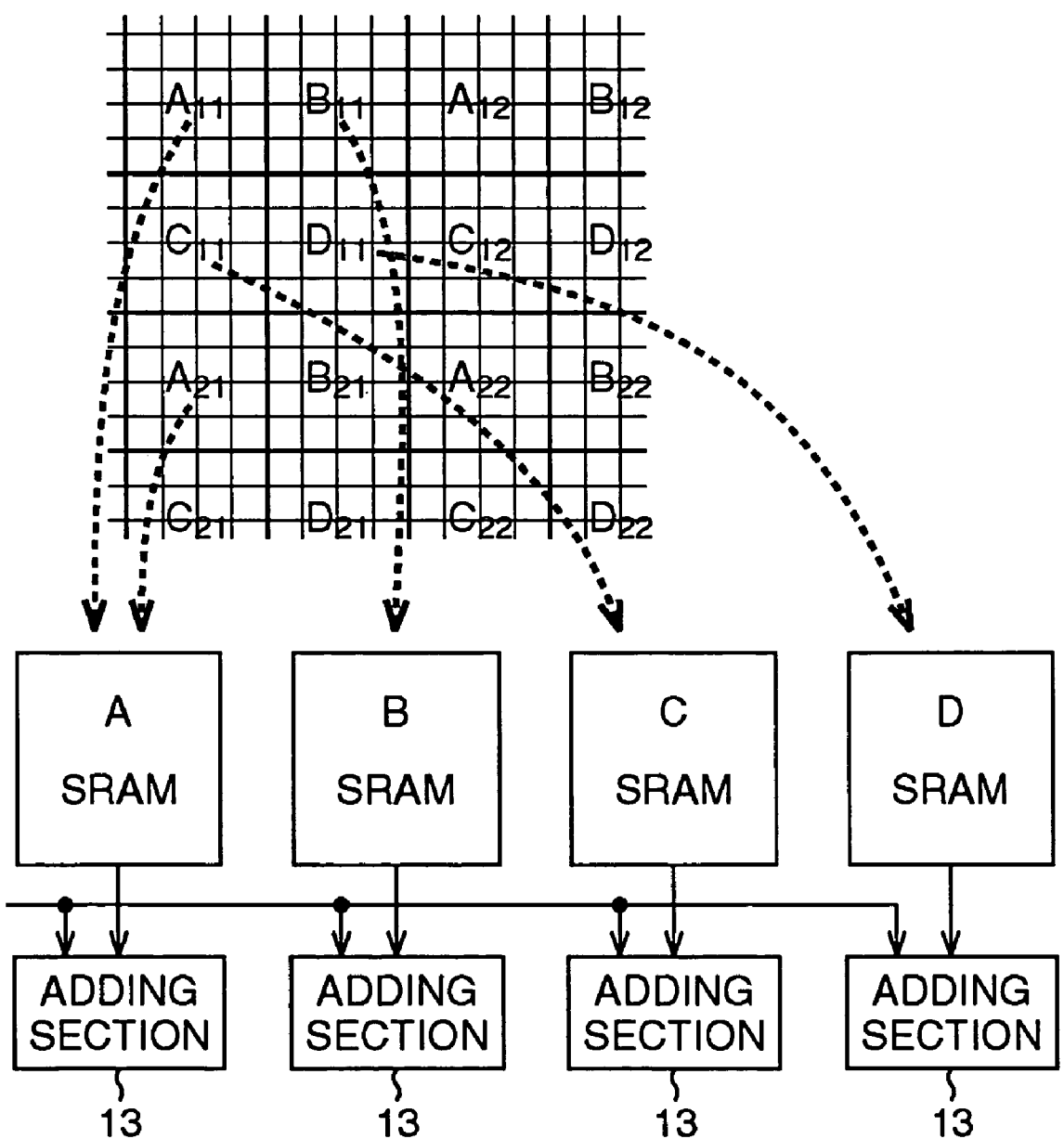
FIG. 3 is a schematic view showing pixel data of a small block being stored in each memory cell.

Subsequently, as shown in FIG. 3, all of the small blocks $A_{ij}$, $B_{ij}$, $C_{ij}$, and $D_{ij}$ forming each of the large blocks are stored in the SRAMs A, B, C, and D, respectively. Here, each memory cell stores a pixel data row (in this case 16-data row) as one unit, and can simultaneously read out each of the stored data row by specifying one address thereof.

It should be noted that equivalent bits of each of pixel data forming a small block in each memory cell are preferably arranged close together to be added up at the time of adding operation described later. In this way, the number of wires in the adding section 13 can be reduced. In addition, by further dividing each memory cell into groups therein, the read-out speed can be further enhanced. Furthermore, upon the read-out of each pixel data, bit length of pixel data can be modified by masking certain bids thereof.

Figure 4:
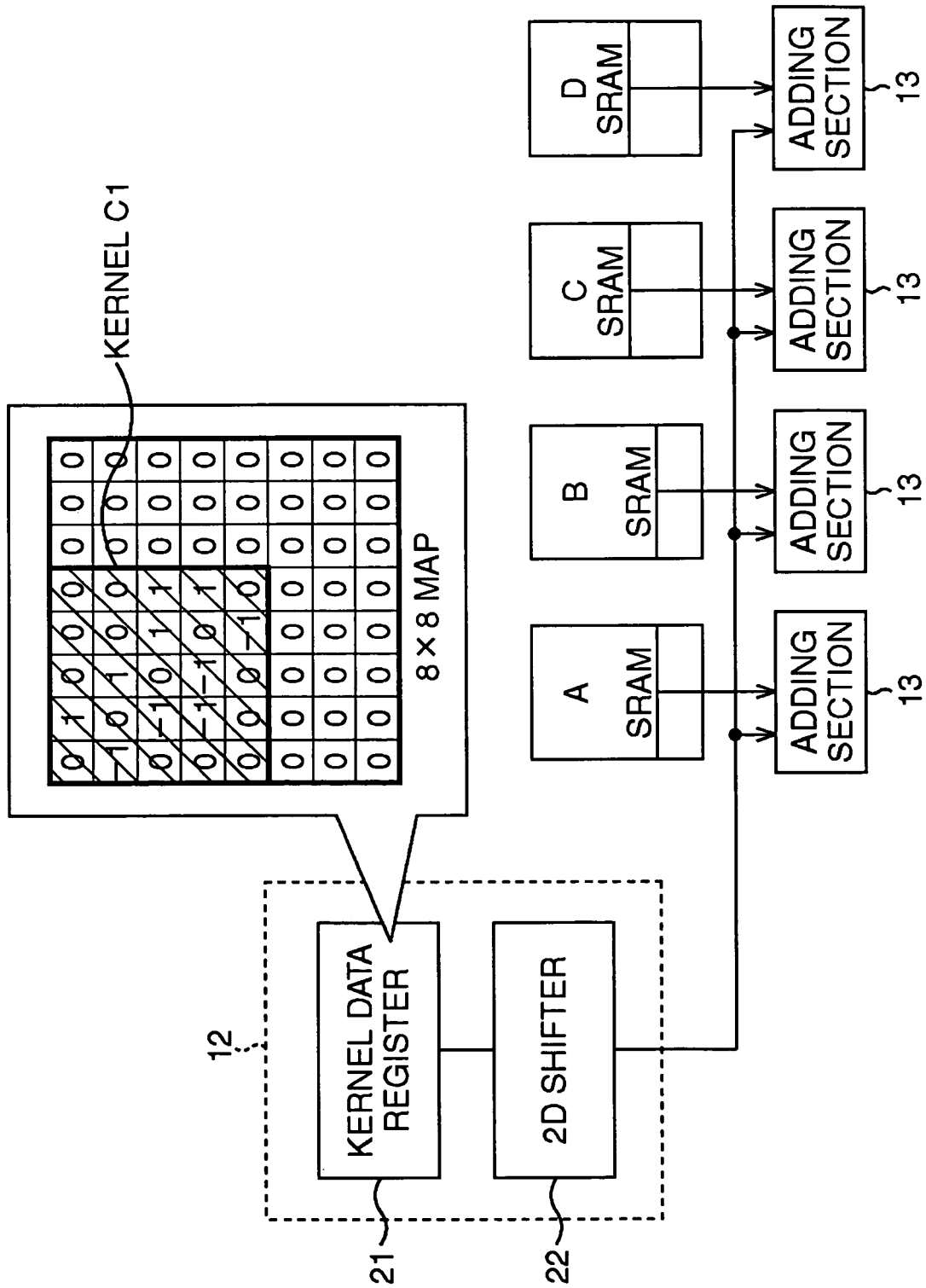
FIG. 4 is a schematic view showing a coefficient matrix controller in detail.

On the other hand, as shown in FIG. 4, the coefficient controller 12 consists of a kernel register 21 which is a coefficient storage section to store a certain coefficient matrix, and a 2D shifter 22 which is a converting section of coefficient matrix to rearrange the coefficient matrix into a predetermined order and correspond them to the above-described pixel data.

The kernel register 21 includes a coefficient matrix which corresponds to a part of a group of pixel data of a two-dimensional image, forming a kernel C1. The coefficient matrix is formed of predetermined coefficients, which are three coefficients of −1, 0, and 1 in the case hereof, one example of which is shown in FIG. 4.

It is noted that multiplication of −1 (subtraction) uses twos complement, and calculation using twos complement is achieved by adding a bit-flipping of a pixel data having coefficient of −1, and adding the number of −1s to an appropriate bit position of the result of the addition.

Figure 5:
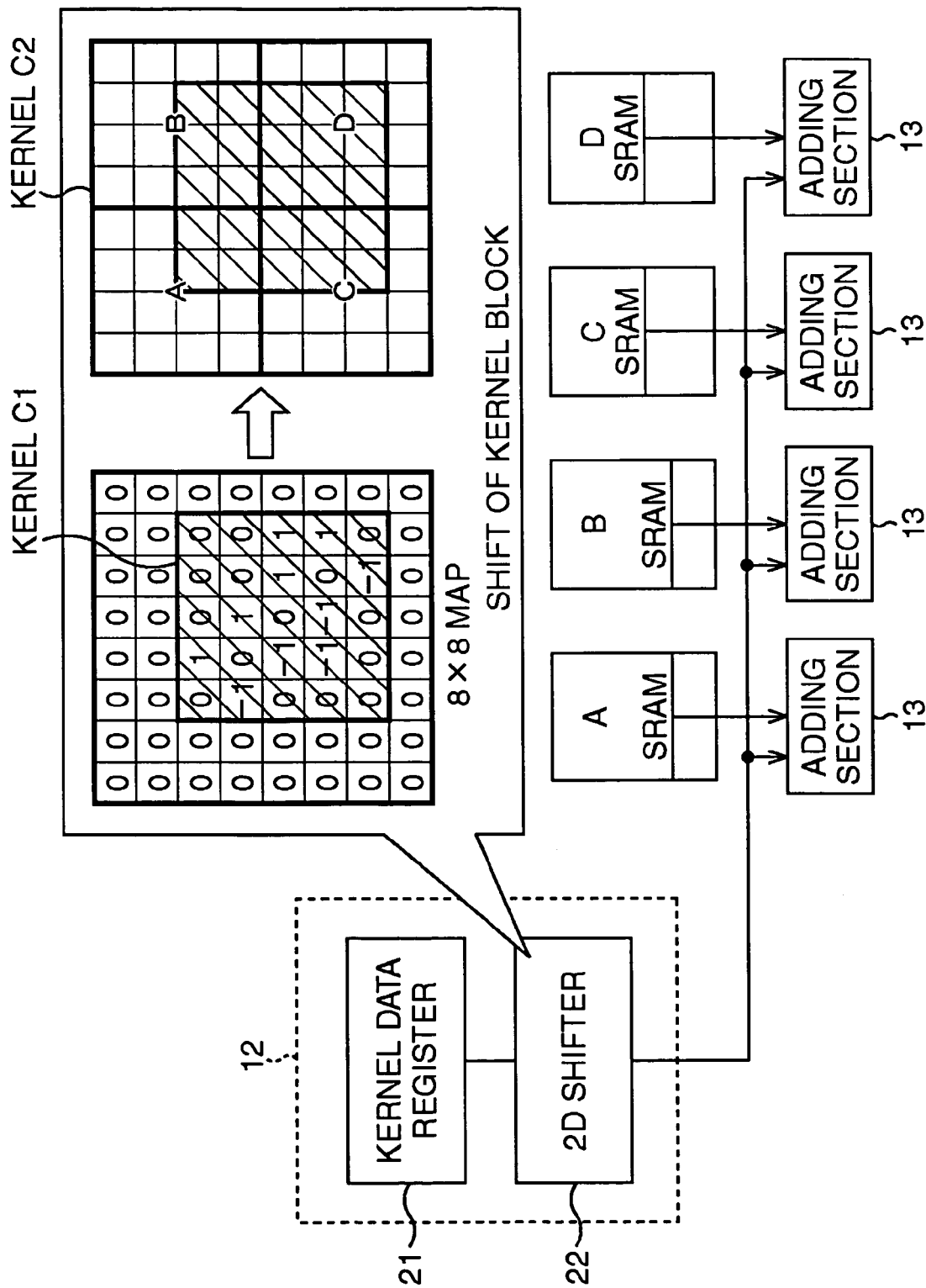
FIG. 5 is a schematic view showing a state in detail in which each pixel data is multiplied by a coefficient matrix.

When image processing is performed for a large block formed of 2.times.2 small blocks, each thereof further formed of 4.times.4 pixels, where data of pixels in the large block are multiplied by coefficients, for example, pixel data rows of the small blocks $A_{ij}$, $B_{ij}$, $C_{ij}$, and $D_{1j}$ are read out respectively from the SRAMs A, B, C, and D, and multiplied by coefficients forming kernel C1, as shown in FIG. 5.

The above-described computation process is performed for each pixel by the kernel register 21 which rearranges the coefficients into a predetermined order, that is to say, shifts the kernel C1 by corresponding them to the pixel data within the large block. In other words, the addresses of the SRAMs A to D are not modified during the series of the computation proceedings, and each pixel data row read out from the SRAMs A to D (pixel data rows of 64 pixels altogether forming the large block) remains constant, whilst the coefficient matrix is converted. Accordingly, for example, the computation by shifting the kernel C1 as shown in FIG. 5 essentially leads to an result equivalent to one obtained by the computation by corresponding a kernel C2 to pixel data in the large block. Here, since multiplication is required only for the kernel C1, in the example shown, all the remaining part of the 8.times.8 map excluding the kernel C1 may be set to 0 (zero).

As described above, upon the computational processing performed to each of all the necessary pixels, the image processing unit according to the present embodiment causes just one-time access to each pixel data in each large block, and computed results for all the necessary pixels can be obtained without modifying addresses of memory cells and simply by shifting the coefficient matrix. In this way, a high-speed processing of extremely high efficiency can be attained.

In the following, an optimal relationship between the size of a kernel and small/large blocks will be described.

Figure 6:
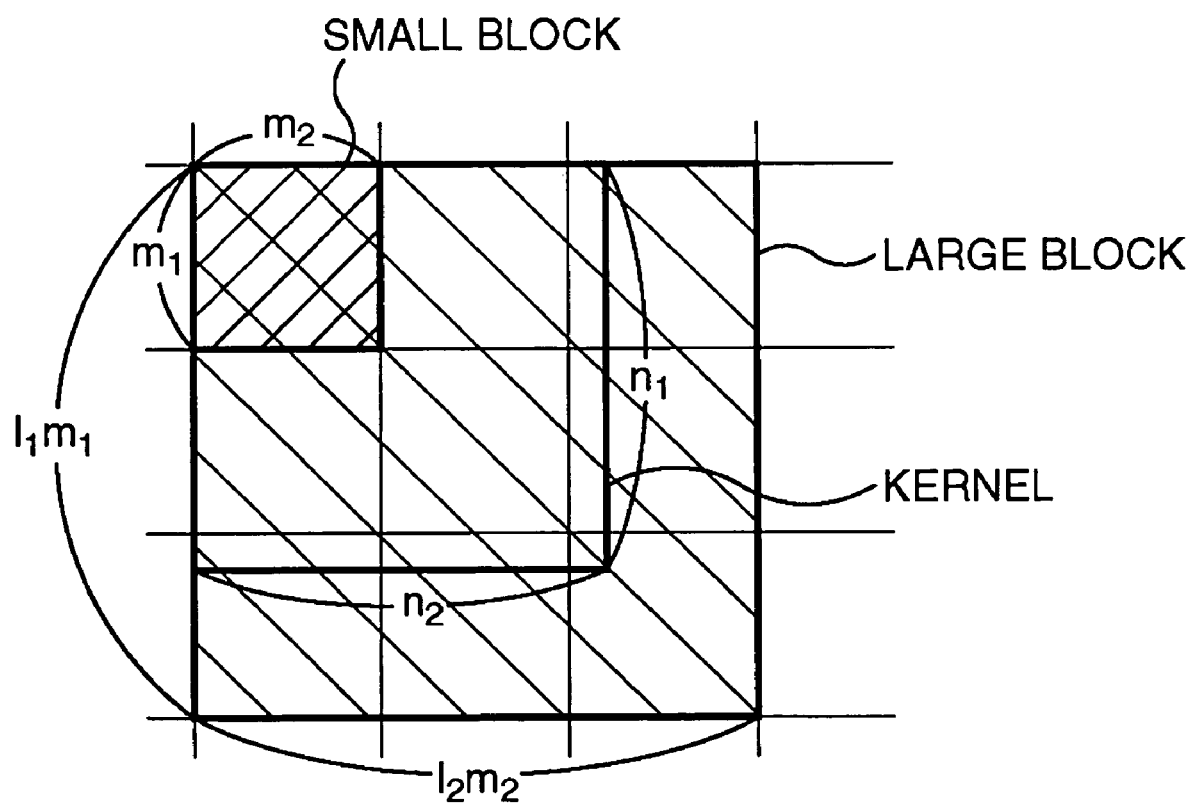
FIG. 6 is a schematic view showing an optimal relationship between a size of a kernel and small/large blocks.

As shown in FIG. 6, where a small block is formed of $m_1 \times m_2$ pixel data, a large block is formed of $l_1 \times l_2$ small blocks, and a coefficient matrix of the kernel C1 is formed of $n_1 \times n_2$ coefficients, the size of the kernel C1 is determined so as to fulfill:

$$n_1 \leq m_1(l_1-1)+1$$

and $$n_2 \leq m_2(l_2-1)+1.$$

In the example of FIG. 5, $m_1 \times m_2$ is 4×4, and $l_1 \times l_2$ is 2×2. The size of kernel C1, or $n_1 \times n_2$, is 5×5 or smaller (in the example of FIG. 5, $n_1 \times n_2$=5×5). Incidentally, with a structure as shown in FIG. 5, regardless of where the kernel is located while being shifted within the large block, pertinent data can be simultaneously accessed without fail by the memory cell corresponding to each small block.

The results of multiplication thus obtained for each pixel data are added up for each memory cell in the adding section 13 provided in the neighborhood of each memory cell. Hence, each adding section 13 obtaining each computed result enables transfer of just compressed partway results. Since data volume of a coefficient is less than that of a pixel in general, the entire traffic of data can be reduced such that pixel data are not transferred from memory cell, but coefficients are transferred to memory cell and only the result computed and compressed in the neighborhood of the memory cell is transferred back from the memory cell.

Figure 7:
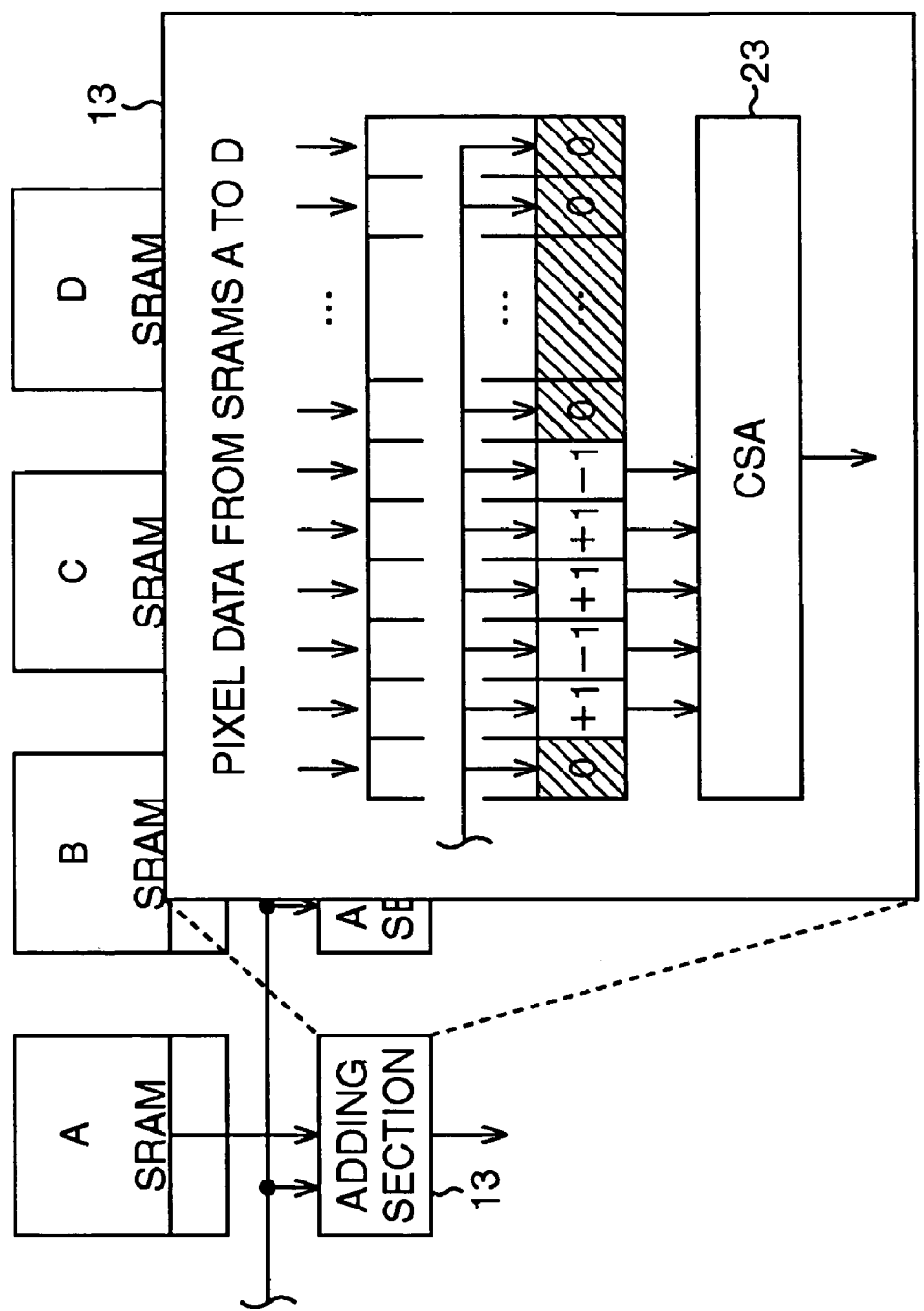
FIG. 7 is a schematic view showing a configuration of an adding section in detail.
Figure 9:
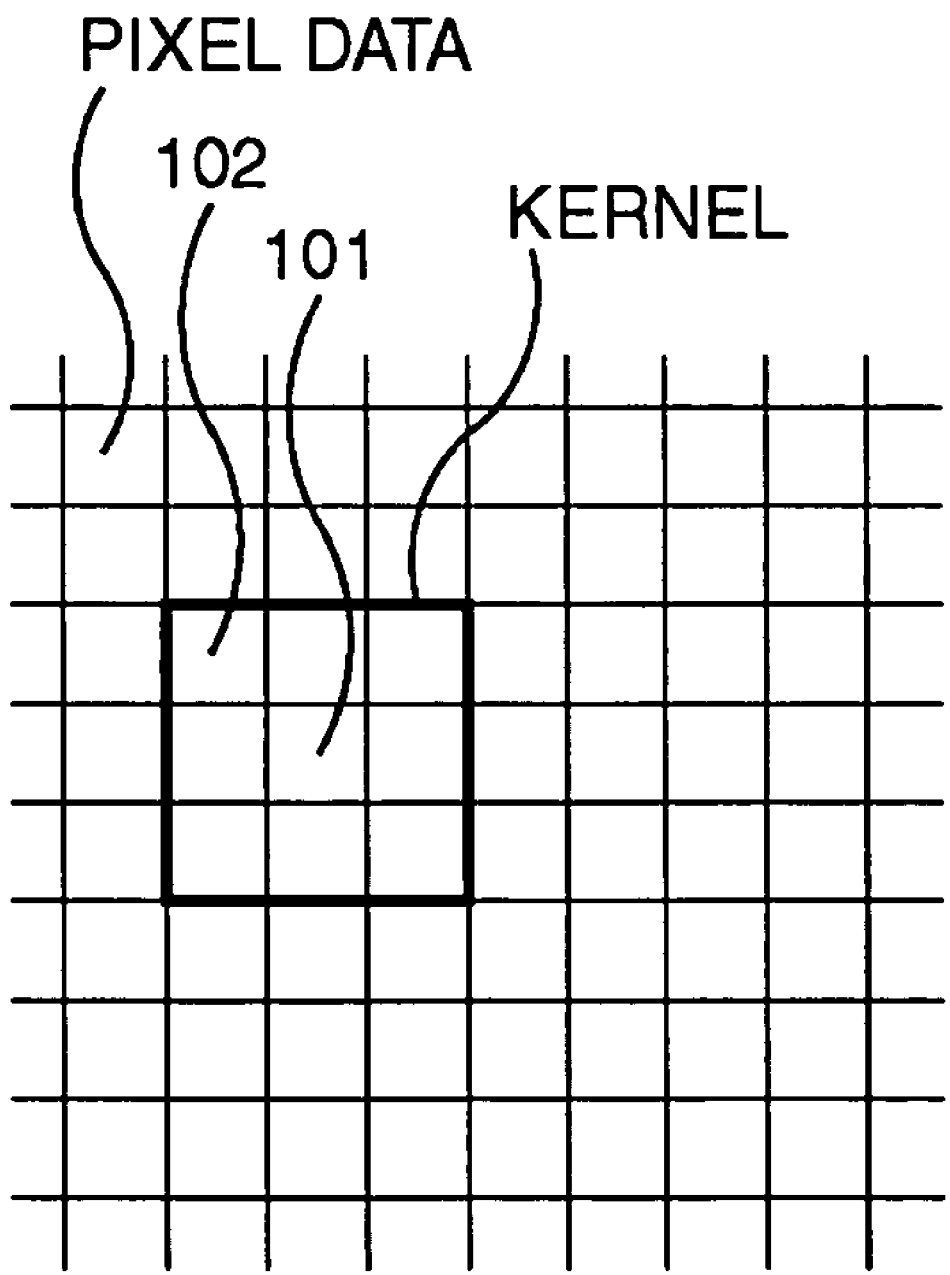
FIG. 9 is a schematic view showing a conventional image processing method.

For example, as shown in FIG. 5, where the kernel C1 shifts for computation, a pixel data row of $(X_1, X_2, \ldots X_{16})$ read out from the SRAM A is multiplied by a coefficient matrix $\{A_{i,j}\}$ (I, j=1-5), and added up by a high-speed CSA (Carry Save Adder) not propagating carries shown in FIG. 7. Incidentally, coefficients of −1 and 1 are realized by bit flipping and "AND" respectively, and the multi-valued logic of three values is used for data transfer bus in order to transfer coefficients −1, 0, and 1.

The result of the above computation is as follows:

$$\text{Computed result} = 0 \times X_1 + 0 \times X_2 + \ldots + A_{1,1} \times X_{11} +$$
$$A_{1,2} \times X_{12} + \ldots + A_{2,1} \times X_{15} + A_{2,2} \times X_{16}$$
$$= 0 \times X_{11} + 1 \times X_{12} - 1 \times X_{15} + 0 \times X_{16}$$
$$= X_{12} - X_{15}$$

Subsequently, the computed results in each adding section 13 are added up in the entire adding section 14 to obtain a sum, which is outputted as a result of the computation proceeding of a certain pixel data.

It should be noted that whilst the coefficient matrix of the kernel C1 is configured as shown in FIGS. 4 and 5 in the present embodiment, such configurations are not restrictive and various types of coefficients may be applied. One example thereof is shown in FIG. 8, in which (a) is a 3×3 smoothing (mean) filter, (b) is a 5×5 smoothing (mean) filter, (c) is a 5×5 vertical edge extracting filter, and (d) is a Gaussian filter, in each of which the processing result is shown on the left side of the kernel. In the case of (d), the coefficients necessary for the Gaussian filter, which are more complex than those for other filters, are realized with a simple combination of three kernels as shown.

The image processing device and image processing method of the present invention can thus process images without loss using relatively simple combination of equipment, in an extremely short time, and with low power consumption.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An image processing device to perform image processing, comprising:
   a two-dimensional image being formed of a group of pixel data which are a matrix of plural pixel data, wherein said group of pixels are divided into small blocks formed of a plurality of said pixel data, a plurality of said small blocks form a large block, and in each of the large block each of the small blocks is defined and arranged by certain rules, said image processing device comprising:
   a plurality of storages, in which each of said small blocks located according to said rules forming each of said large blocks has said pixel data independently, and by specifying an address assigned to each small block, a plurality of pixel data in a pertinent small block is simultaneously read out;
   a calculator comprising a coefficient matrix in which a matrix of plural coefficients are arranged, so that said plural coefficients are multiplied by each of respectively corresponding pixel data and summed up;
   wherein said calculator multiplies each of the pixel data in each of said small blocks forming said one large block, by said coefficient matrix rearranged in to a predetermined order, and
   wherein said small block is formed of said pixel data of $m_1 \times m_2$, said large block is formed of the small blocks of $l_1 \times l_2$, said coefficient matrix is formed of said coefficients of $n_1 \times n_2$, and the following equations are fulfilled:

$n_1 \leq m_1(l_1-1)+1$ $n_2 \leq m_2(l_2-1)+1$ $m_1 \geq 4$ $m_2 \geq 4$ $l_1 \geq 2$ and $l_2 \geq 2$.

2. The image processing device according to claim 1, further comprising an coefficient storage section to store said matrix coefficient specified, an coefficient matrix converting section to rearrange the coefficient matrix into a predetermined order and correspond them to the pixel data, and an adding section to obtain a sum of the pixel data, the pixel data being multiplied by the coefficients.

3. The image processing device according to claim 1, wherein said adding section is provided for each of said storages in a neighborhood of each of the storage, and each added result of each adding section is independently transferred.

4. The image processing device according to claim 1, wherein, by specifying each address of each of said small block forming said one large block, said coefficient matrix is shifted by said calculator, not causing modification of pertinent addresses of the small blocks, and a plurality of said sums are obtained corresponding to each of said rearrangement performed to each of said coefficient matrix.

5. An image processing method to perform image processing, comprising: forming a two-dimensional image from a group of pixel data which are a matrix of plural pixel data, wherein:
   said group of pixel data are divided into a plurality of small blocks formed of said pixel data, a plurality of small blocks further form a large block, in each of which each small block is defined and arranged by certain rules, and a plurality of coefficients are arranged in the form of matrix to form a coefficient matrix;
   each of said small blocks located according to said rules forming each of said large blocks stores pixel data independently in each storage, and by specifying an address assigned to each small block, a plurality of pixel data in a pertinent small block is simultaneously read out from said storage;
   said respective pixel data of each of the small block forming said one large block, which are read out from a plurality of said storage, are multiplied by said coefficients rearranged into a predetermined order and summed up; and,
   wherein said small block is formed of said pixel data of $m_1 \times m_2$, said large block is formed of the small blocks of $l_1 \times l_2$, said coefficient matrix is formed of said coefficients of $n_1 \times n_2$, and the following equations are fulfilled:

$n_1 \leq m_1(l_1-1)+1$ $n_2 \leq m_2(l_2-1)+1$ $m_1 \geq 4$ $m_2 \geq 4$ $l_1 \geq 2$ and $l_2 \geq 2$.

6. The image processing method according to claim 5, wherein, by specifying each address of each of said small block forming said one large block, said coefficient matrix is shifted by said calculator, not causing modification of pertinent addresses of the small blocks, and a plurality of said sums are obtained corresponding to each of said rearrangement performed to each of said coefficient matrix.

* * * * *